US012752596B2

(12) United States Patent
Hemi et al.

(10) Patent No.: US 12,752,596 B2
(45) Date of Patent: Oct. 6, 2026

(54) PUMP CONTROL FOR COMPLEX VEHICLE COOLING SYSTEM

(71) Applicant: FCA US LLC, Auburn Hills, MI (US)

(72) Inventors: Hanane Hemi, Auburn Hills, MI (US); Sina Shojaei, Auburn Hills, MI (US); Kamal Bouyoucef, Auburn Hills, MI (US); Feisel Weslati, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 101 days.

(21) Appl. No.: 18/972,109

(22) Filed: Dec. 6, 2024

(65) Prior Publication Data

US 2026/0158859 A1 Jun. 11, 2026

(51) Int. Cl.
*B60K 11/02* (2006.01)
*B60H 1/00* (2006.01)

(52) U.S. Cl.
CPC ..... *B60H 1/00885* (2013.01); *B60H 1/00807* (2013.01); *B60K 11/02* (2013.01)

(58) Field of Classification Search
CPC ....................... B60H 1/00807; B60H 1/00885; B60K 11/02; B60K 2001/003
See application file for complete search history.

(56) References Cited

U.S. PATENT DOCUMENTS

2010/0050676 A1* 3/2010 Takamatsu ............. B60K 11/02 62/259.2
2013/0269911 A1* 10/2013 Carpenter .............. B60H 1/004 165/104.19
2021/0061063 A1* 3/2021 Sun ........................... F01P 3/02
2023/0318516 A1* 10/2023 Snyder ..................... B60K 6/28 318/471
2024/0059135 A1* 2/2024 Barciela Díaz-Blanco ................ H01M 10/052
2024/0359531 A1* 10/2024 Jairazbhoy ......... B60H 1/00807

* cited by examiner

*Primary Examiner* — Jonathan Bradford
(74) *Attorney, Agent, or Firm* — Jeremy J. Klobucar

(57) ABSTRACT

A vehicle thermal system includes a coolant circuit having at least one coolant loop, a pump, a valve, and a component to be cooled. A controller is programmed to receive a flow target indicating a coolant flow required to cool the component, receive a coolant temperature and a position of the valve, determine a pressure drop for a given flow target, coolant temperature, and valve position, determine a maximum flow based on the given flow target, coolant temperature, and valve position, determine a pump pressure rise for the given flow target and coolant temperature, and a pump speed required to meet the given flow target, determine a pump maximum pressure rise for the given coolant temperature, and a maximum coolant flow rate and a pump maximum speed, determine a final pump speed required to meet the received flow target, and command the pump to operate at the final pump speed.

20 Claims, 7 Drawing Sheets

PUMP CONTROL FOR COMPLEX VEHICLE COOLING SYSTEM

FIELD

The present application relates generally to vehicle cooling systems and, more particularly, to a vehicle cooling system with physics-based pump speed control.

BACKGROUND

Modern vehicles commonly include multiple devices such as electric motors and turbocharged engines that are cooled on a single cooling circuit. Because the cooling circuit has different coolant flow requirements for each device, more than one pump is often required to achieve cooling of individual components efficiently. In order to provide the necessary cooling, conventional cooling systems depend on accurate calibration tables (e.g., databases) or experimental data to determine target pump speed. However, determining the correct pump speeds to meet target coolant flows is complex due to dynamic changes in the system, such as valve positions, coolant temperature, and flow regimes. Accordingly, while such conventional cooling systems work for their intended purpose, it is desirable to provide improvement in the relevant art.

SUMMARY

According to one example aspect of the invention, a thermal system for a vehicle is provided. In one exemplary implementation, the thermal system includes a coolant circuit having at least one coolant loop, a pump configured to circulate coolant in the coolant circuit, a valve disposed in the coolant circuit, and a component thermally coupled to the coolant circuit for cooling thereby.

A thermal management system includes a controller having one or more processors and a non-transitory computer-readable storage medium having a plurality of instructions stored thereon, which, when executed by the one or more processors, cause the one or more processors to perform operations comprising: receive a flow target indicating a coolant flow required to cool the component to a predetermined temperature; receive a coolant temperature, and a valve position of the valve; determine a pressure drop in the thermal system for a given flow target, coolant temperature, and valve position; determine a maximum flow for the thermal system based on the given flow target, coolant temperature, and valve position; determine a pressure rise of the pump for the given flow target and coolant temperature, and a pump speed required to meet the given flow target; determine a maximum pressure rise of the pump for the given coolant temperature, and a maximum coolant flow rate and a maximum speed of the pump; determine a final pump speed required to meet the received flow target, based on the determined pressure drop of the pump and the determined maximum pressure rise of the pump; and command the pump to operate at the final pump speed.

In addition to the foregoing, the described thermal system may include one or more of the following features: wherein the controller is further configured to compare the determined pressure rise of the pump and the determined maximum pressure drop of the pump; wherein if the determined pressure rise of the pump is below the determined maximum pressure rise of the pump, the controller determines the final pump speed required to meet the received flow target, based on the determined pressure rise of the pump and the determined maximum pressure rise of the pump; and wherein if the determined pressure rise of the pump is greater than the determined maximum pressure rise of the pump, the controller is configured to: adjust the received flow target to be equal to a maximum flow for the pump; determine a new pressure rise of the pump based on the adjusted received flow target; and determine the final pump speed required to meet the received flow target, based on the determined new pressure rise of the pump and the determined maximum pressure rise of the pump.

In addition to the foregoing, the described thermal system may include one or more of the following features: wherein the pressure drop in the thermal system is determined using the equation $\Delta p_S(T,\vartheta,Q)=\alpha(T,\vartheta)+\beta(T,\vartheta)\cdot Q+\gamma(T,\vartheta)\cdot Q^2$, where T is coolant temperature, $\vartheta$ is a position of the valve, Q is coolant flow, and $\alpha$, $\beta$, $\gamma$ are coefficients determined from vehicle test data and/or hydraulic simulations.

In addition to the foregoing, the described thermal system may include one or more of the following features: wherein the maximum flow for the thermal system is determined using the equation $\Delta p_P(T,Q_{max},\omega_{max})=\Delta p_S(T_i,\vartheta_j,Q_{max})$, where $\Delta p_P$ is a pressure rise of the pump, T is coolant temperature, $Q_{max}$ is a maximum coolant flow for the pump or thermal system, $\omega_{max}$ is a maximum speed of the pump, $\Delta p_S$ is a pressure drop of the thermal system for a given coolant temperature $T_i$ and a given valve position $\vartheta_j$.

In addition to the foregoing, the described thermal system may include one or more of the following features: wherein the pressure rise of the pump is determined using the equation $\Delta p_P(T,Q^t,\omega_r)=\Delta p_S(T_i,\vartheta_j,Q^t)$, where $\Delta p_P$ is the pressure rise of the pump, T is coolant temperature, $Q^t$ is the received target flow, $\omega_r$ is pump speed, $\Delta p_S$ is a pressure drop of the thermal system for a given coolant temperature $T_i$ and a given valve position $\vartheta_j$.

In addition to the foregoing, the described thermal system may include one or more of the following features: wherein the final pump speed is determined using the equation $$\frac{\Delta p_P(T,Q^t,\omega_r)}{\Delta p_P(T,Q_{max},\omega_{max})}=\left(\frac{\omega_r}{\omega_{\max}}\right)^2,$$

where $\Delta p_P$ is the pressure rise of the pump, T is coolant temperature, $Q^t$ is the received target flow, $\omega_r$ is pump speed, $Q_{max}$ is a maximum coolant flow for the pump or thermal system, and $\omega_{max}$ is a maximum speed of the pump.

In addition to the foregoing, the described thermal system may include one or more of the following features: wherein the pressure drop in the thermal system and the maximum flow for the thermal system are determined from a mathematical model of the thermal system, and wherein the mathematical model of the thermal system is derived by considering an electric circuit model equivalent to the at least one coolant loop by respectively equating coolant flow and pressure drop or rise to current and voltage, and equating the pump to a battery, and equating the component to a variable electrical resistance; and wherein the controller is further configured to apply Kirchhoff's first and second laws to the equivalent electric circuit model to determine coolant flows through the at least one coolant loop.

According to another example aspect of the invention, a method is provided of determining a pump speed for a thermal system comprising a coolant circuit having at least one coolant loop, a pump configured to circulate coolant in the coolant circuit, a valve disposed in the coolant circuit, and a component thermally coupled to the coolant circuit for cooling thereby. In one exemplary implementation, the method includes receiving, at a controller having one or more processors, a flow target indicating a coolant flow required to cool the component to a predetermined temperature; receiving, at the controller, a coolant temperature, and a valve position of the valve; determining, by the controller, a pressure drop in the thermal system for a given flow target, coolant temperature, and valve position; determining, by the controller, a maximum flow for the thermal system based on the given flow target, coolant temperature, and valve position; determining, by the controller, a pressure rise of the pump for the given flow target and coolant temperature, and a pump speed required to meet the given flow target; determining, by the controller, a maximum pressure rise of the pump for the given coolant temperature, and a maximum coolant flow rate and a maximum speed of the pump; determining, by the controller, a final pump speed required to meet the received flow target, based on the determined pressure rise of the pump and the determined maximum pressure rise of the pump; and commanding, by the controller, the pump to operate at the final pump speed.

In addition to the foregoing, the described method may include one or more of the following features: comparing the determined pressure rise of the pump and the determined maximum pressure drop of the pump; wherein if the determined pressure rise of the pump is below the determined maximum pressure rise of the pump, the method further includes determining the final pump speed required to meet the received flow target, based on the determined pressure rise of the pump and the determined maximum pressure rise of the pump; and wherein if the determined pressure rise of the pump is greater than the determined maximum pressure rise of the pump, the method further includes adjusting, by the controller, the received flow target to be equal to a maximum flow for the pump; determining, by the controller, a new pressure rise of the pump based on the adjusted received flow target; and determining, by the controller, the final pump speed required to meet the received flow target, based on the determined new pressure rise of the pump and the determined maximum pressure drop of the pump.

In addition to the foregoing, the described method may include one or more of the following features: wherein the pressure drop in the thermal system is determined using the equation $\Delta p_S(T,\vartheta,Q)=\alpha(T,\vartheta)+\beta(T,\vartheta)\cdot Q+\gamma(T,\vartheta)\cdot Q^2$, where T is coolant temperature, $\vartheta$ is a position of the valve, Q is coolant flow, and $\alpha$, $\beta$, $\gamma$ are coefficients determined from vehicle test data and/or hydraulic simulations.

In addition to the foregoing, the described method may include one or more of the following features: wherein the maximum flow for the thermal system is determined using the equation $\Delta p_P(T, Q_{max}, \omega_{max})-\Delta p_S(T_i,\vartheta_j,Q_{max})$, where $\Delta p_P$ is a pressure drop of the pump, T is coolant temperature, $Q_{max}$ is a maximum coolant flow for the pump or thermal system, $\omega_{max}$ is a maximum speed of the pump, $\Delta p_S$ is a pressure rise of the thermal system for a given coolant temperature $T_i$ and a given valve position $\vartheta_j$.

In addition to the foregoing, the described method may include one or more of the following features: wherein the pressure drop of the pump is determined using the equation $\Delta p_P(T,Q^t,\omega_r)=\Delta p_S(T_i,\vartheta_j,Q^t)$, where $\Delta p_P$ is the pressure drop of the pump, T is coolant temperature, $Q^t$ is the received target flow, $\omega_r$ is pump speed, $\Delta p_S$ is a pressure drop of the thermal system for a given coolant temperature $T_i$ and a given valve position $\vartheta_j$.

In addition to the foregoing, the described method may include one or more of the following features: wherein the final pump speed is determined using the equation $$\frac{\Delta p_P(T, Q^t, \omega_r)}{\Delta p_P(T, Q_{max}, \omega_{max})} = \left(\frac{\omega_r}{\omega_{\max}}\right)^2,$$

where $\Delta p_P$ is the pressure rise of the pump, T is coolant temperature, $Q^t$ is the received target flow, $\omega_r$ is pump speed, $Q_{max}$ is a maximum coolant flow for the pump or thermal system, and $\omega_{max}$ is a maximum speed of the pump.

In addition to the foregoing, the described method may include one or more of the following features: wherein the pressure drop in the thermal system and the maximum flow for the thermal system are determined from a mathematical model of the thermal system, wherein the mathematical model of the thermal system is derived by considering an electric circuit model equivalent to the at least one coolant loop by respectively equating coolant flow and pressure drop or rise to current and voltage, and equating the pump to a battery, and equating the component to a variable electrical resistance; and applying, by the controller, Kirchhoff's first and second laws to the equivalent electric circuit model to determine coolant flows through the at least one coolant loop.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously described, one or more pumps are used to provide coolant flow in electrified vehicle (EV) thermal systems. As the complexity of the EV thermal systems increases, accurate determination of the pump speeds that provide the desired coolant flow control through the system becomes increasingly more critical. Current methods of determining pump speeds relies heavily on experimental data from the vehicle. However, as the systems become more complex, the size of the experimental data set that is required for such data-driven methods increases exponentially, in turn posing various challenges with respect to cost and feasibility.

Accordingly, the systems and methods described herein provide a physics-based method for determining appropriate speeds of the coolant pumps in an EV thermal system. In general, the system is based on a mathematical model of the thermal system, which describes the relationship between pump speeds and the coolant flow rate throughout the thermal system as a function of coolant temperature and valve position. The mathematical model may be hosted in the vehicle control unit(s) and may communicate with various physical and virtual sensors of the vehicle.

In one example, the EV thermal system includes complex liquid coolant loops interconnected by valves in which coolant flow is controlled by means of multiple electric coolant pumps. Depending on the position of the valves, the thermal system can be divided into multiple individual loops that have different coolant flow requirements depending on the specific thermal management function that they fulfill. The flow requirements are arbitrated by controlling each of the various coolant pumps that are available to the thermal management system. Accurate control of the coolant flows has a significant role in achieving the maximum performance of such thermal systems, hence the significance of determining the appropriate speed of the pumps as the enabler of accurate flow control.

Figure 1:
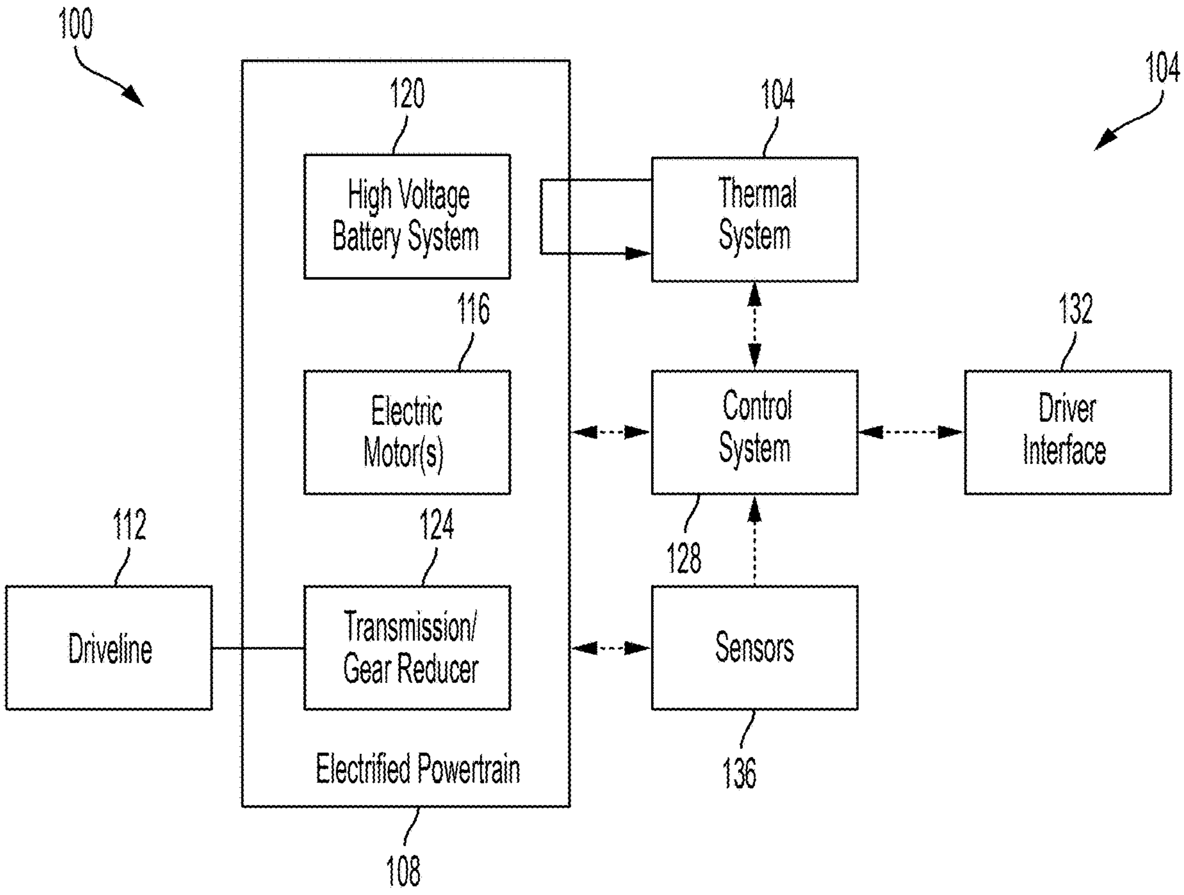
FIG. 1 is a functional block diagram of an electrified vehicle having an example thermal management system in accordance with the principles of the present application.

With initial reference to FIG. 1, a functional block diagram of an electrified vehicle 100 having a thermal system 104 according to the principles of the present application is illustrated. The electrified vehicle 100 includes an electrified powertrain 108 configured to generate and transfer torque to a driveline 112 for propulsion. The electrified powertrain 108 includes at least one electric motor 116 (e.g., a three-phase electric traction motor) powered by a high voltage battery pack or system 120. The electrified powertrain 108 also includes a transmission or gear reducer 124 configured to transfer the drive torque from the electric motor(s) 116 to the driveline 112. While an electric-only configuration of the electrified vehicle 100 (a battery electric vehicle, or BEV) is illustrated, it will be appreciated that the electrified powertrain 108 could further include another energy generator, such as an internal combustion engine (a hybrid electric vehicle, or HEV) and/or a hydrogen or other suitable fuel cell system (a fuel cell electric vehicle, or FCEV).

A control system 128 controls operation of the electrified vehicle 100, which primarily includes controlling the electrified powertrain 108 to generate a desired amount of drive torque to satisfy a driver torque request provided via a driver interface 132 (e.g., an accelerator pedal). A plurality of sensors 136 are configured to measure operating parameters of the electrified vehicle 100, such as, but not limited to, speeds/accelerations, pressures, temperatures, and thermal system parameters (coolant temperature, coolant flowrate, pump speed, valve status, etc.).

Figure 2:
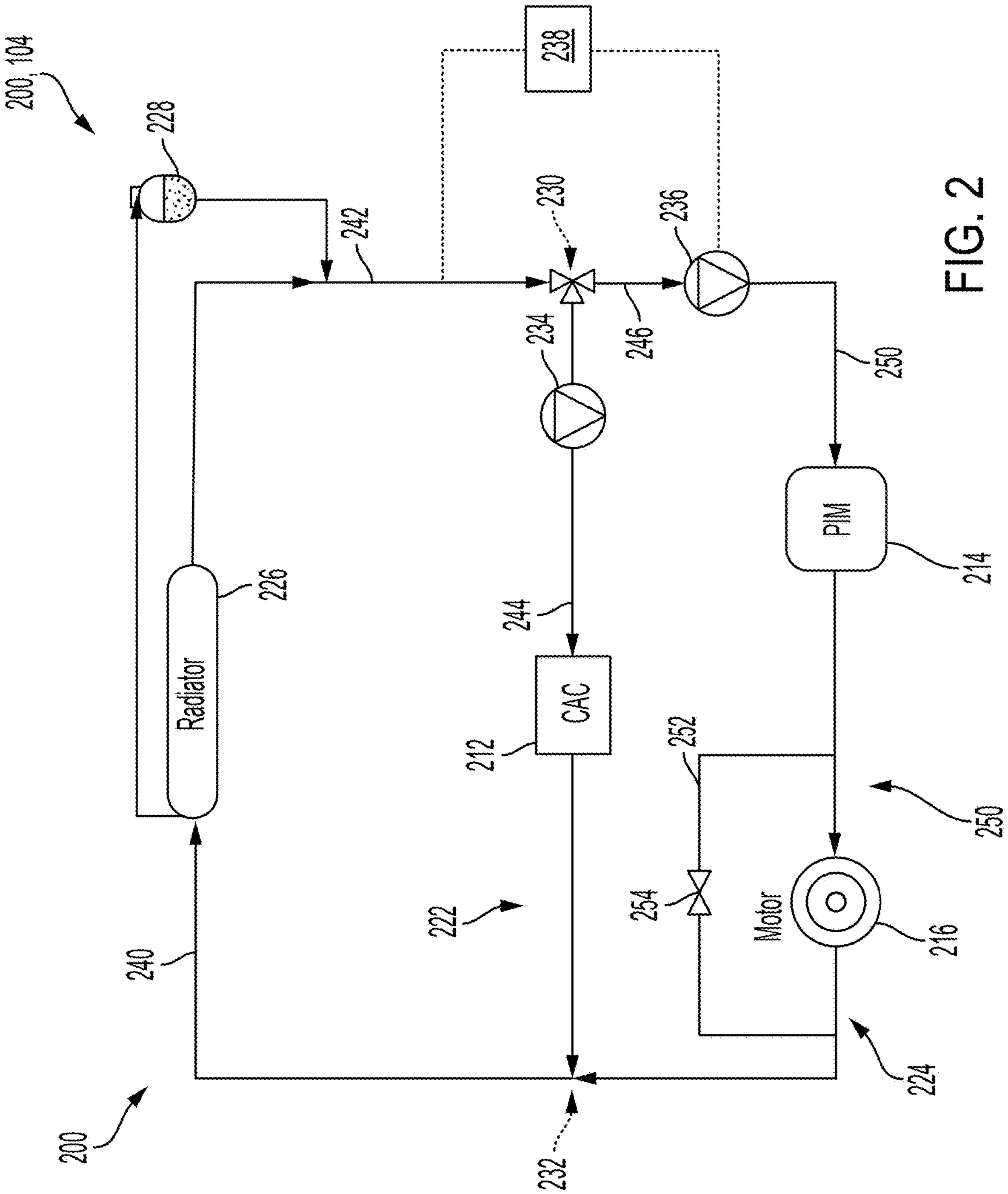
FIG. 2 is a schematic illustration of an example thermal system in accordance with the principles of the present disclosure.

With reference now to FIG. 2, one example architecture 200 of the vehicle thermal system 104 is illustrated according to the principles of the present application. The thermal system 104 is configured to provide heating/cooling to various components of the vehicle such as a charge air cooler (CAC) 212, a power inverter module (PIM) 214, and an electric motor 216. However, thermal system 104 may include various other components such as, for example, the high voltage battery system 120. In the example embodiment, the thermal system 104 is a high temperature circuit 220 configured to circulate a heat transfer fluid or coolant (e.g., water, ethylene glycol, etc.) therein.

As shown in the illustrated example, the high temperature circuit 220 generally includes a first loop 222, a second loop 224, a high temperature radiator 226, and an overflow bottle 228. It will be appreciated that circuit 220 is merely one example and the model-based multi-pump control described herein may be utilized with numerous thermal system architectures and configurations. A first node having a three-way valve 230 defines a coolant split between the first and second loops 222, 224, and a second node 232 defines a convergence of the first and second loops 222, 224. A first pump 234 is disposed on the first loop 222, and a second pump 236 is disposed on the second loop 224. However, it will be appreciated that pumps 234, 236 may be located in different locations and may be arranged in series or parallel.

Thermal system 104 includes a controller 238 such as an electronic control unit (ECU), which is in signal communication with the first and second pumps 234, 236. As described herein in more detail, controller 238 utilizes a physics-based model to determine a pump speed to achieve a flow target for efficient cooling of a thermally coupled component (in this case CAC 212, PIM 214, motor 216).

In the example implementation, a first branch conduit 240 directs heated coolant to the high temperature radiator 226 where the heated coolant is cooled by ambient air and/or an airflow created by a fan (not shown). The coolant is then directed through a coolant return line 242 to the first three-way valve 230. A first portion of coolant is directed to a second branch conduit 244 of the first loop 222, and a second portion of coolant is directed to a second return line 246 of the second loop 224. The first portion of coolant passes through the first pump 234 and is subsequently utilized to cool the CAC 212, which is thermally coupled to the first loop 222. The heated coolant then passes through the second three-way valve 232 and into the first branch conduit 240 where the cycle is then repeated. It will be appreciated that in some operations, three-way valve 230 may prevent coolant flow through second branch conduit 244.

In the example embodiment, the second portion of coolant from the first three-way valve 230 is directed to the second pump 236 via the second coolant return line 246. The second pump 236 supplies coolant via a third branch conduit 250 to provide cooling to the PIM 214 and motor 216, which are thermally coupled to the second loop 224. The heated coolant then passes through the second three-way valve 232 and into the first branch conduit 240 where the cycle is then repeated. The thermal system 104 may also include a bypass line 252 with a valve 254 to control fluid flow therethrough. It will be appreciated that in some scenarios, three-way valve 230 may prevent coolant flow through third branch conduit 250.

Figure 3:
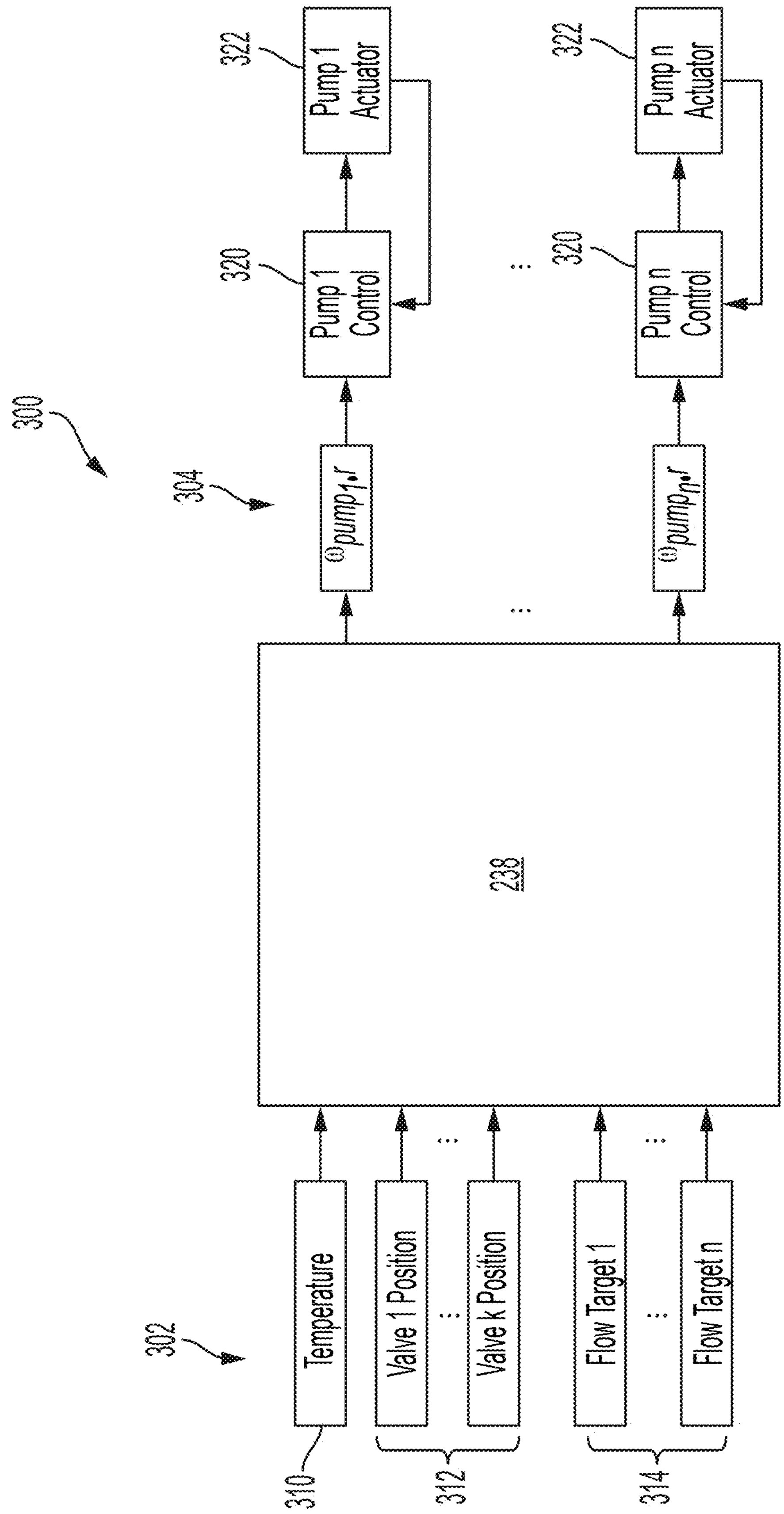
FIG. 3 is a schematic block diagram of an example control architecture of the thermal management system of FIG. 1, in accordance with the principles of the present disclosure.

With reference now to FIG. 3, an example control architecture 300 of the vehicle thermal system 104 according to the principles of the present application is illustrated. While the control architecture 300 specifically references the electrified vehicle 100 and thermal system 104 and their components for illustrative/descriptive purposes, it will be appreciated that the control architecture 300 could be applicable to any suitably configured vehicle. In general, the control architecture 300 includes controller 238, which receives inputs 302 (e.g., from sensors 136), and utilizes the methods/algorithms described herein to determine outputs 304 for controlling the thermal system pumps (e.g., pumps 234, 236). In this way, the control architecture 300 is a "flow solver" configured to provide a pump speed to meet a target flow in each branch to cool the component to a desired temperature.

In the example embodiment, the inputs 302 include coolant temperature 310, valve position 312, and flow target 314. The coolant temperature 310 is a temperature of the coolant in thermal system 104. The valve position 312 indicates the position of any number of valves ('Valve 1' to 'Valve k'). In one example, valve position refers a degree of valve opening between a fully open position and a fully closed position. The flow target 314 indicates a target coolant flowrate to achieve a desired cooling for a thermal system component (e.g., motor 216). The system may include any number of flow targets 314 ('Flow Target 1' to 'Flow Target n') depending on complexity and number of components, pumps, branches, etc.

The controller 238 is configured to receive the inputs 302 and utilize the methods described herein to determine the appropriate speeds of all pumps within the coolant loop to achieve the flow targets for all possible positions of the valve and range of coolant temperatures. Once the appropriate pump speeds are determined, they are provided as outputs 304 to low-level pump controllers 320, which in turn control the pump actuators 322. This may be utilized for any number of pumps 322 ('Pump 1' to 'Pump n').

Figure 4A:
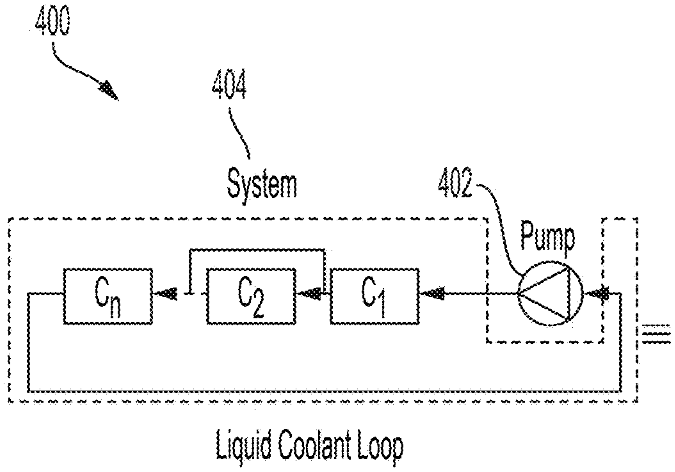
FIG. 4 is a schematic illustration of an example liquid coolant loop and an equivalent electric circuit model, in accordance with the principles of the present disclosure.
Figure 4B:
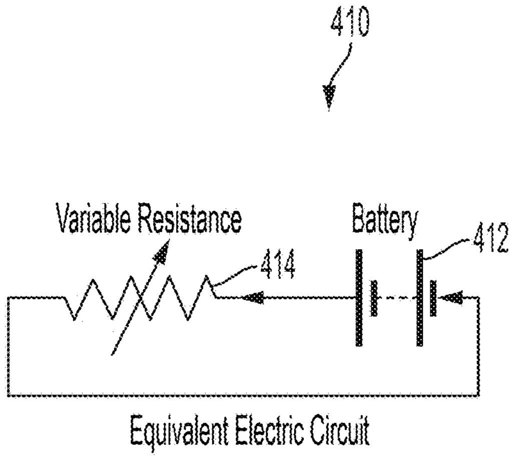

With reference now to FIGS. 4-9, an example operation of the control architecture 300 to determine pump speeds of the thermal system 104 will be described in more detail. In general, the control is configured to determine the pump speed needed for a given flow target based on deriving a set of mathematical equations for flow of coolant in the liquid coolant loop. The derivation includes developing a mathematical model for the pumps and a mathematical model for the thermal system, which includes multiple components and coolant loops. As shown in FIG. 4, a liquid coolant loop 400 includes the pumps 402 and a system 404 that includes vehicle components C, valves (not shown), and conduits/pipes, can be derived by considering an equivalent electric circuit model 410 of the coolant loops by equating coolant flow and pressure drop to current and voltage, respectively. In this model, the pumps 402 are equated to a battery 412 while the combination of all other components within the coolant loop 400 and system 404 are equated to a variable electrical resistance 414, as shown in FIG. 4.

Figure 5:
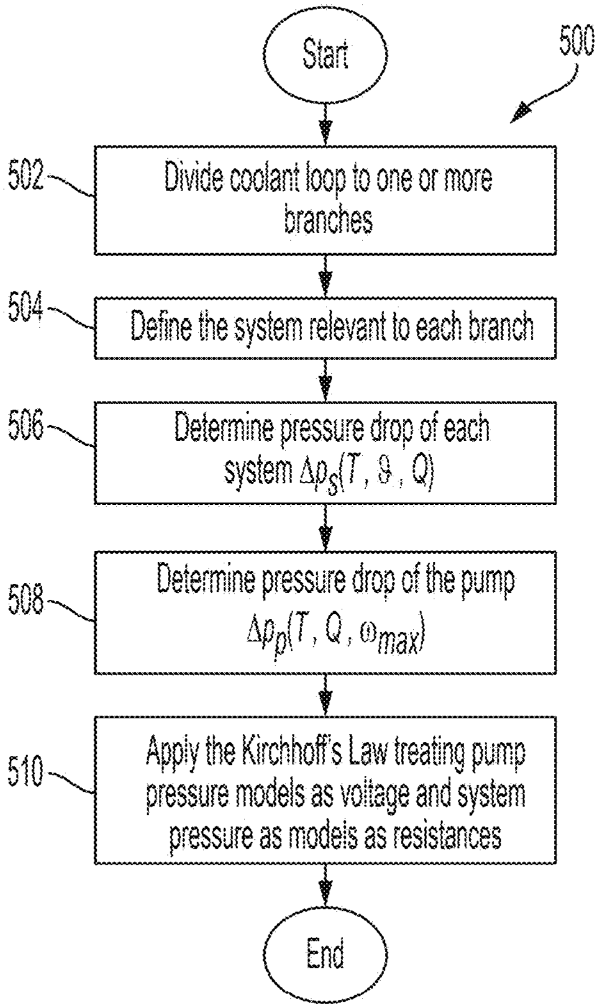
FIG. 5 is a flow diagram of an example method of determining thermal system equations of the thermal system shown in FIG. 1, in accordance with the principles of the present application.

FIG. 5 illustrates a method 500 for determining the thermal system equations for each branch and pump of a complex coolant loop having multiple branches with multiple pumps in series or parallel. This is done by building an equivalent electric circuit for the multiple liquid coolant loops. At 502, the coolant loop is divided into one or more branches of this equivalent circuit. At 504, the method defines the systems relevant to each branch. This may include deciding what combination of components and conduits are to be considered as one unit.

At 506, the method determines a system model for each branch. The system is represented by the pressure drop $\Delta p_s$ that the coolant exhibits as it flows through the system, which is a function of coolant temperature T, valve positions $\vartheta$ within the systems, and the coolant flow Q: $\Delta p_s = \Delta p_s(T, \vartheta, Q)$.

Figure 6:
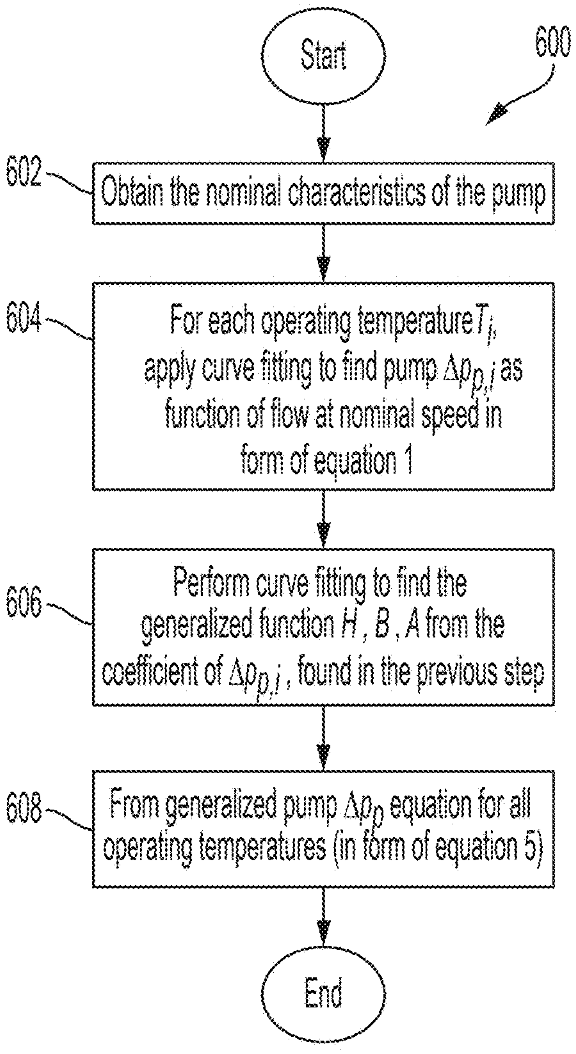
FIG. 6 is a flow diagram of an example method of determining a pump model of the thermal system shown in FIG. 1, in accordance with the principles of the present application.

At 508, the method determines a pumps model for all possible coolant temperatures (see FIG. 6). The pumps model is represented by $\Delta p_P(T, Q, \omega_{max})$, where $\Delta p_P$ is a pressure rise for the maximum pump speed, T is coolant temperature, Q is coolant flow, and $\omega_{max}$ is maximum pump speed.

At 510, the equivalent circuit is constructed, and Kirchhoff's law is applied thereto with all branch resistances and pumps equations set. The Kirchhoff first law is applied to the electric equivalent circuit to determine the flows through the branches. The sum of the flows for any pipes junction is zero. The Kirchhoff second law is also applied, where the sum of all pressure drops in the closed loop is equal to zero. This second law can be used in series, parallel, or complex circuits.

FIG. 6 illustrates a method 600 of developing the pump model in its most generalized form. At 602, the method obtains the nominal pump characteristics in the form of pump flow and pump head at nominal speed for all possible operating temperatures. At 604, the method performs a curve fitting to find the pressure rise of the pump for each operating temperature in the form of Equation (1) shown below:

$$\Delta p_P(T, Q, \omega_{max}) = H(T, \omega_{max}) + B(T, \omega_{max}) * Q - A(T, \omega_{\text{max}}) * Q^2, \quad (1)$$

where $\Delta p_{Pi}$ is the pressure rise of the pump at coolant temperature $T_i$ for the maximum pump speed $\omega_{max}$, Q is coolant flow, and vectors $[H_i]$, $[B_i]$ and $[A_i]$ are the curve fitting coefficients for coolant temperature $T_i$.

At 606, the method performs a curve fitting to vectors $[H_i]$, $[B_i]$ and $[A_i]$ to find the generalized function H, B, A in the following form:

$$H(T) = a_H * T^2 + b_H * T + c_H \quad (2)$$

$$B(T) = a_B * T^2 + b_B * T + c_B \quad (3)$$

$$A(T) = a_A * T^2 + b_A * T + c_A \quad (4)$$

where coefficients a, b, and c are determined from curve fitting.

At 608, the method forms the generalized pump pressure rise equation using Equations (2), (3), and (4). In the example embodiment, for centrifugal pumps, the generalized pump pressure rise equation can take polynomial form of $2^{nd}$ or higher:

$$\Delta p_P(T, Q, \omega_{max}) = H(T, \omega_{max}) + B(T, \omega_{max}) * Q - A(T, \omega_{max}) * Q^2 \quad (5)$$

In Equation (5), $\Delta p_P$ represents pressure rise for the maximum pump speed, Q represents coolant flow, and T represents the coolant temperature. Coefficients H, B, A are determined from the characteristic curves.

Generalizing on pump speed w, Equation (5) can be written as:

$$\Delta p_P(T, Q, \omega) = \left(\frac{\omega}{\omega_{max}}\right)^2 \cdot \quad (6)$$

-continued $$\left[H(T,\omega_{max})+B(T,\omega_{max})\cdot\left(\frac{\omega_{max}}{\omega}\right)\cdot Q-A(T,\omega_{max})\cdot\left(\frac{\omega_{max}}{\omega}\right)^2\cdot Q^2\right]$$

The system model can be derived by using data from hydraulic test or hydraulic simulation of the thermal system. Such data will include measurements or calculations of coolant flow and pressure variation at different locations of the thermal system for various combinations of coolant temperature, pump speed, and valve position. The pressure drop of the thermal system, for a given coolant temperature $T_i$ and a given operating model of the thermal system (e.g., for a given valve position combination $\vartheta_j$), can be described in the general form of:

$$\Delta p_{s,i,j}(T_i,\vartheta_j,Q)=\alpha_{i,j}(T_i,\vartheta_j)+\beta_{i,j}(T_i,\vartheta_j)\cdot Q+\gamma_{i,j}(T_i,\vartheta_j)\cdot Q^2 \tag{7}$$

In Equation (7), $\Delta p_{s,i,j}$ is the pressure drop of the coolant as it flows in the branch and Q is the coolant flow rate. Coefficients $\alpha_{i,j}$, $\beta_{i,j}$, $\gamma_{i,j}$ are the thermal system coefficients determined from vehicle test or hydraulic simulations of the thermal system at temperature $T_i$ and valve position $\vartheta_j$. These coefficients are determined with routine mathematic curve fitting.

In a more generalized form, considering a matrix of all possible coolant temperatures and valve positions, equation (7) can be rewritten in the generalized form for the pressure drop of the full system, as follows:

$$\Delta p_S(T,\vartheta,Q)=\alpha(T,\vartheta)+\beta(T,\vartheta)\cdot Q+\gamma(T,\vartheta)\cdot Q^2 \tag{8}$$

In equation (8), $\alpha(T,\vartheta)$, $\beta(T,\vartheta)$, and $\gamma(T,\vartheta)$ are the generalized functions derived from matrix coefficients $[\alpha_{ij}]$, $[\beta_{ij}]$, and $[\gamma_{ij}]$, respectively.

Figure 7:
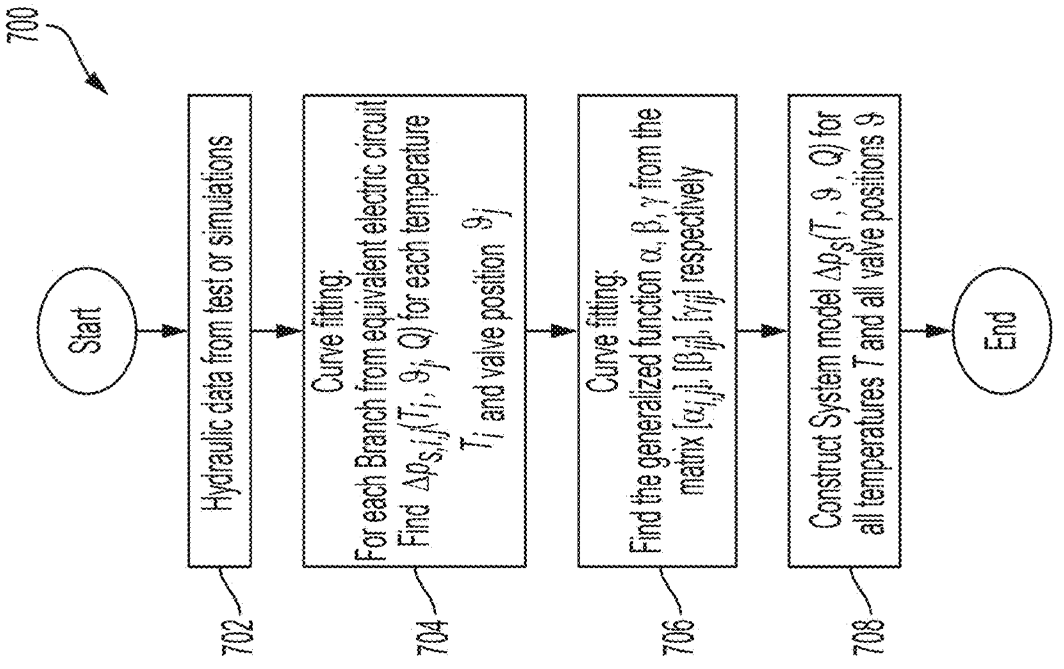
FIG. 7 is a flow diagram of an example method of determining a thermal system pressure drop equation of the thermal system shown in FIG. 1, in accordance with the principles of the present application.

FIG. 7 illustrates a method 700 of determining equation (4). At 702, the method receives hydraulic data from tests or simulations. At 704, the method performs a curve fitting by, for each branch of the equivalent electric circuit, determining the pressure drop of the coolant $\Delta p_{s,i,j}(T_i,\vartheta_j,Q)$ for each temperature $T_i$ and valve position $\vartheta_j$. At 706, the method performs a curve fitting by finding the generalized function $\alpha$, $\beta$, $\gamma$ from the matrix $[\alpha_{ij}]$, $[\beta_{ij}]$, and $[\gamma_{ij}]$, respectively. At 708, the method constructs the system model $\Delta p_S(T,\vartheta,Q)$ for all temperatures T and all valve positions $\vartheta$.

Figure 8:
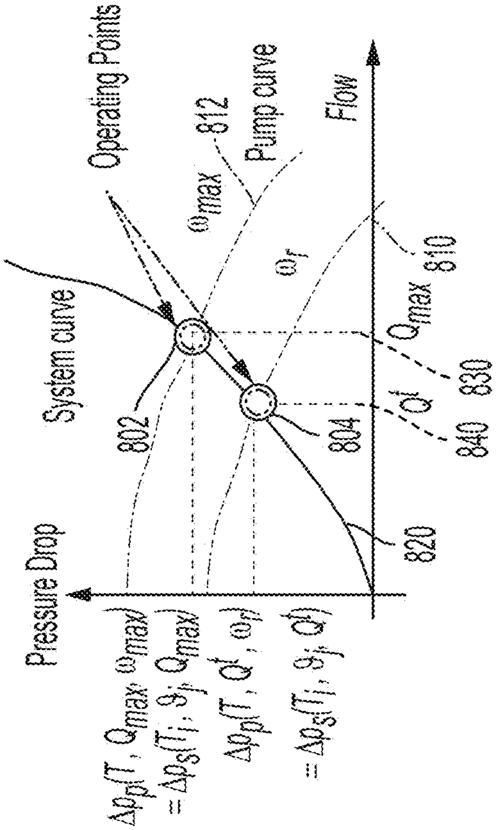
FIG. 8 is a graph plotting the example thermal system equations of the thermal system shown in FIG. 1, in accordance with the principles of the present application.

With reference now to FIG. 8, once the equivalent electric circuit model is constructed from the pump equation and system equation applying Kirchhoff's laws, solving the problem involves finding the intersection of the curves of the system and the pump models. FIG. 8 illustrates a graph 800 showing the operating points 802, 804 resulting from the intersection between the pump curves 810, 812 and the system curve 820 previously determined. Operating point 802 represents a maximum flow at a maximum pump speed, and operating point 804 represents a target flow and the corresponding pump speed. As shown, for the assumed thermal system and pump, the maximum flow 830 ($Q_{max}$) is achievable at maximum pump speed 812 ($\omega_{max}$). In analytical form:

$$\Delta p_P(T,Q_{max},\omega_{max})=\Delta p_S(T_i,\vartheta_j,Q_{max}) \tag{9}$$

Similarly, the flow target 840 ($Q^t$) is achieved at the pump speed 810 ($\omega_r$), as follows:

$$\Delta p_P(T,Q^t,\omega_r)=\Delta p_S(T_i,\vartheta_j,Q^t) \tag{10}$$

Knowing the maximum capability curve of the pump and applying the affinity law, pump speed $\omega_r$ can be calculated with the following:

$$\frac{Q^t}{Q_{max}}=\frac{\omega_r}{\omega_{max}} \tag{11}$$

$$\frac{\Delta p_P(T,Q^t,\omega_r)}{\Delta p_P(T,Q_{max},\omega_{max})}=\left(\frac{\omega_r}{\omega_{max}}\right)^2 \tag{12}$$

Figure 9:
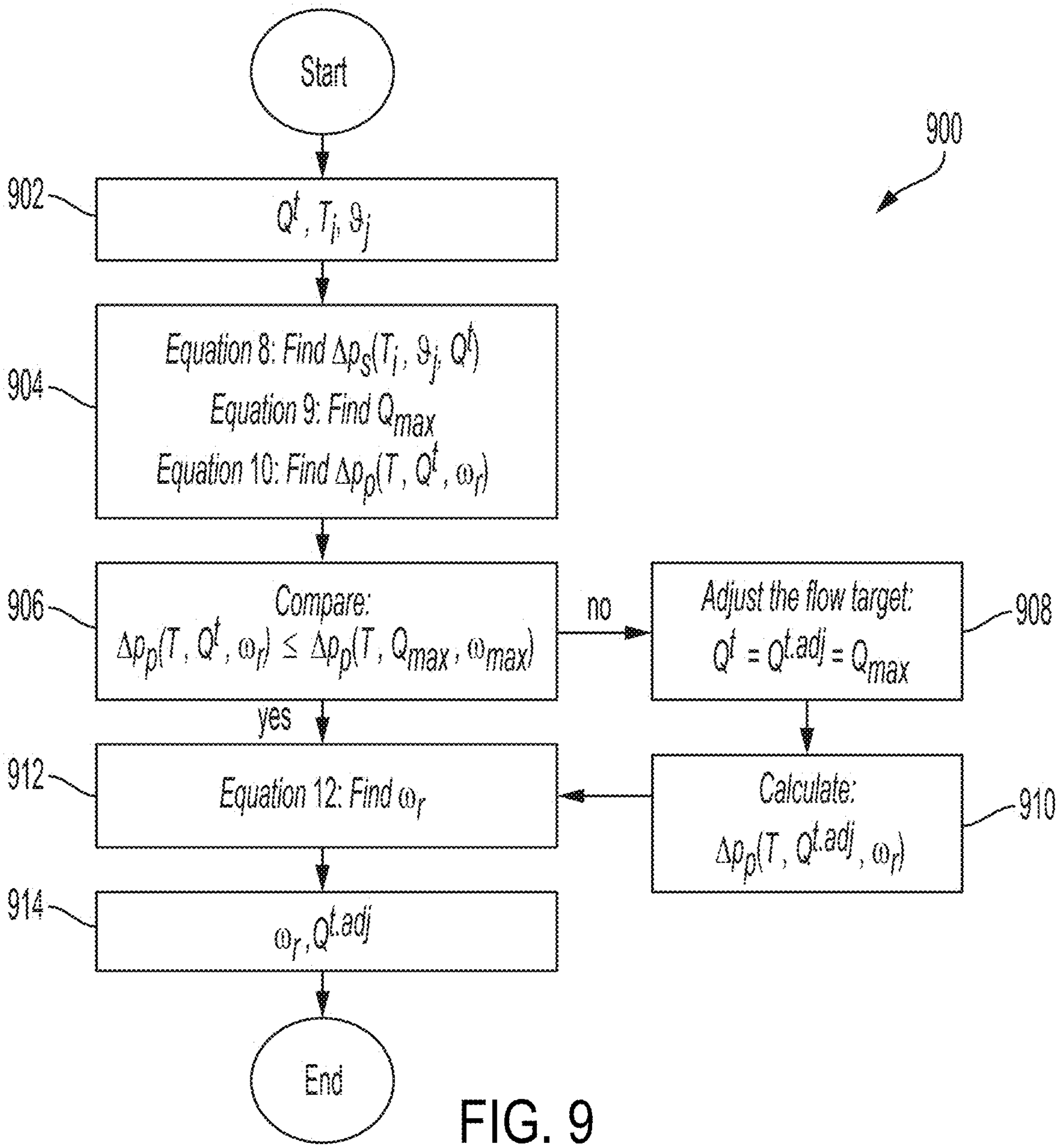
FIG. 9 is a flow diagram of an example method of determining a pump speed for a given flow target of the thermal system shown in FIG. 1, in accordance with the principles of the present application.

Accordingly, based on the foregoing, FIG. 9 illustrates a method 900 of determining pump speed ($\omega_r$) for a given flow target ($Q^t$). This method is performed by the control (e.g., controller 238), for example as shown in FIG. 3. At 902, control receives the flow target 314 ($Q^t$), the coolant temperature 310 ($T_i$), and the valve position 312 ($\vartheta_j$) from the thermal management system controller (e.g., controller 38). At 904, control (i) determines the pressure drop/loss ($\Delta p_S(T_i,\vartheta_j,Q^t)$) of coolant as it flows through the branch for a given coolant temperature, flow target, and valve position by using Equation (8), (ii) determines the maximum flow ($Q_{max}$) through the branch for the thermal system based on the given coolant temperature, and valve position, using Equation (9), and (iii) determines a pressure rise ($\Delta p_P(T,Q^t,\omega_r)$) of the pump for a given coolant temperature, flow target, and the require pump speed, using Equation (10).

At 906, control determines if the pressure rise ($\Delta p_P(T,Q^t,\omega_r)$) is less than or equal to the pressure rise ($\Delta p_P(T,Q_{max},\omega_{max})$) at maximum pump speed. If no, control proceeds to 908. If yes, control proceeds to 912. At 908, control adjusts the flow target to the maximum flow ($Q_{max}$). At 910, control calculates the pressure drop with the adjusted flow target ($Q^{t.adj}$) and proceeds to 912. At 912, control determines the pump speed ($\omega_r$) using Equation (8). At 914, control sends the determined pump speed to the pump controllers 320 for controlling the pump actuators 322. The method then ends or returns to 902.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A thermal system for a vehicle, comprising:

a coolant circuit having at least one coolant loop;

a pump configured to circulate coolant in the coolant circuit;

a valve disposed in the coolant circuit;

a component thermally coupled to the coolant circuit for cooling thereby; and a thermal management system including a controller having one or more processors and a non-transitory computer-readable storage medium having a plurality of instructions stored thereon, which, when executed by the one or more processors, cause the one or more processors to perform operations comprising:

receive a flow target indicating a coolant flow required to cool the component to a predetermined temperature;

receive a coolant temperature, and a valve position of the valve;

determine a pressure drop in the thermal system for a given flow target, coolant temperature, and valve position;

determine a maximum flow for the thermal system based on the given flow target, coolant temperature, and valve position;

determine a pressure rise of the pump for the given flow target and coolant temperature, and a pump speed required to meet the given flow target;

determine a maximum pressure rise of the pump for the given coolant temperature, and a maximum coolant flow rate and a maximum speed of the pump;

determine a final pump speed required to meet the received flow target, based on the determined pressure drop of the pump and the determined maximum pressure rise of the pump; and command the pump to operate at the final pump speed.

2. The thermal system of claim 1, wherein the controller is further configured to perform operations comprising:

compare the determined pressure rise of the pump and the determined maximum pressure drop of the pump.

3. The thermal system of claim 2, wherein if the determined pressure rise of the pump is below the determined maximum pressure rise of the pump, the controller determines the final pump speed required to meet the received flow target, based on the determined pressure rise of the pump and the determined maximum pressure rise of the pump.

4. The thermal system of claim 2, wherein if the determined pressure rise of the pump is greater than the determined maximum pressure rise of the pump, the controller is configured to perform further operations comprising:

adjust the received flow target to be equal to a maximum flow for the pump;

determine a new pressure rise of the pump based on the adjusted received flow target; and determine the final pump speed required to meet the received flow target, based on the determined new pressure rise of the pump and the determined maximum pressure rise of the pump.

5. The thermal system of claim 1, wherein the pressure drop in the thermal system is determined using the equation:

$$\Delta p_S(T, \vartheta, Q) = \alpha(T, \vartheta) + \beta(T, \vartheta) \cdot Q + \gamma(T, \vartheta) \cdot Q^2,$$

where T is coolant temperature, $\vartheta$ is a position of the valve, Q is coolant flow, and $\alpha$, $\beta$, $\gamma$ are coefficients determined from vehicle test data and/or hydraulic simulations.

6. The thermal system of claim 1, wherein the maximum flow for the thermal system is determined using the equation:

$$\Delta p_P(T, Q_{max}, \omega_{max}) = \Delta p_S(T_i, \vartheta_j, Q_{max}),$$

where $\Delta p_P$ is a pressure rise of the pump, T is coolant temperature, $Q_{max}$ is a maximum coolant flow for the pump or thermal system, $\omega_{max}$ is a maximum speed of the pump, $\Delta p_S$ is a pressure drop of the thermal system for a given coolant temperature $T_i$ and a given valve position $\vartheta_j$.

7. The thermal system of claim 1, wherein the pressure rise of the pump is determined using the equation:

$$\Delta p_P(T, Q^t, \omega_r) = \Delta p_S(T_i, \vartheta_j, Q^t),$$

where $\Delta p_P$ is the pressure rise of the pump, T is coolant temperature, $Q^t$ is the received target flow, $\omega_r$ is pump speed, $\Delta p_S$ is a pressure drop of the thermal system for a given coolant temperature $T_i$ and a given valve position $\vartheta_j$.

8. The thermal system of claim 1, wherein the final pump speed is determined using the equation:

$$\frac{\Delta p_P(T, Q^t, \omega_r)}{\Delta p_P(T, Q_{max}, \omega_{max})} = \left(\frac{\omega_r}{\omega_{max}}\right)^2,$$

where $\Delta p_P$ is the pressure rise of the pump, T is coolant temperature, $Q^t$ is the received target flow, $\omega_r$ is pump speed, $Q_{max}$ is a maximum coolant flow for the pump or thermal system, and $\omega_{max}$ is a maximum speed of the pump.

9. The thermal system of claim 1, wherein the pressure drop in the thermal system and the maximum flow for the thermal system are determined from a mathematical model of the thermal system, wherein the mathematical model of the thermal system is derived by considering an electric circuit model equivalent to the at least one coolant loop by respectively equating coolant flow and pressure drop or rise to current and voltage, and equating the pump to a battery, and equating the component to a variable electrical resistance.

10. The thermal system of claim 9, wherein the controller is further configured to apply Kirchhoff's first and second laws to the equivalent electric circuit model to determine coolant flows through the at least one coolant loop.

11. A method of determining a pump speed for a thermal system comprising a coolant circuit having at least one coolant loop, a pump configured to circulate coolant in the coolant circuit, a valve disposed in the coolant circuit, and a component thermally coupled to the coolant circuit for cooling thereby, the method comprising:

receiving, at a controller having one or more processors, a flow target indicating a coolant flow required to cool the component to a predetermined temperature;

receiving, at the controller, a coolant temperature, and a valve position of the valve;

determining, by the controller, a pressure drop in the thermal system for a given flow target, coolant temperature, and valve position;

determining, by the controller, a maximum flow for the thermal system based on the given flow target, coolant temperature, and valve position;

determining, by the controller, a pressure rise of the pump for the given flow target and coolant temperature, and a pump speed required to meet the given flow target;

determining, by the controller, a maximum pressure rise of the pump for the given coolant temperature, and a maximum coolant flow rate and a maximum speed of the pump;

determining, by the controller, a final pump speed required to meet the received flow target, based on the determined pressure rise of the pump and the determined maximum pressure rise of the pump; and commanding, by the controller, the pump to operate at the final pump speed.

12. The method of claim 11, further comprising:

comparing the determined pressure rise of the pump and the determined maximum pressure drop of the pump.

13. The method of claim 12, wherein if the determined pressure rise of the pump is below the determined maximum pressure rise of the pump, the method further comprises:

determining the final pump speed required to meet the received flow target, based on the determined pressure rise of the pump and the determined maximum pressure rise of the pump.

14. The method of claim 12, wherein if the determined pressure rise of the pump is greater than the determined maximum pressure rise of the pump, the method further comprises:

adjusting, by the controller, the received flow target to be equal to a maximum flow for the pump;

determining, by the controller, a new pressure rise of the pump based on the adjusted received flow target; and determining, by the controller, the final pump speed required to meet the received flow target, based on the determined new pressure rise of the pump and the determined maximum pressure drop of the pump.

15. The method of claim 11, wherein the pressure drop in the thermal system is determined using the equation:

$$\Delta p_S(T, \vartheta, Q) = \alpha(T, \vartheta) + \beta(T, \vartheta) \cdot Q + \gamma(T, \vartheta) \cdot Q^2,$$

where T is coolant temperature, $\vartheta$ is a position of the valve, Q is coolant flow, and $\alpha$, $\beta$, $\gamma$ are coefficients determined from vehicle test data and/or hydraulic simulations.

16. The method of claim 11, wherein the maximum flow for the thermal system is determined using the equation:

$$\Delta p_P(T, Q_{max}, \omega_{max}) = \Delta p_S(T_i, \vartheta_j, Q_{max}),$$

where $\Delta p_P$ is a pressure drop of the pump, T is coolant temperature, $Q_{max}$ is a maximum coolant flow for the pump or thermal system, $\omega_{max}$ is a maximum speed of the pump, $\Delta p_S$ is a pressure rise of the thermal system for a given coolant temperature $T_i$ and a given valve position $\vartheta_j$.

17. The method of claim 11, wherein the pressure drop of the pump is determined using the equation:

$$\Delta p_P(T, Q^r, \omega_r) = \Delta p_S(T_i, \vartheta_j, Q^r),$$

where $\Delta p_P$ is the pressure drop of the pump, T is coolant temperature, $Q^r$ is the received target flow, $\omega_r$ is pump speed, $\Delta p_S$ is a pressure drop of the thermal system for a given coolant temperature $T_i$ and a given valve position $\vartheta_j$.

18. The method of claim 11, wherein the final pump speed is determined using the equation:

$$\frac{\Delta p_P(T, Q^r, \omega_r)}{\Delta p_P(T, Q_{max}, \omega_{max})} = \left(\frac{\omega_r}{\omega_{max}}\right)^2,$$

where $\Delta p_P$ is the pressure rise of the pump, T is coolant temperature, $Q^r$ is the received target flow, $\omega_r$ is pump speed, $Q_{max}$ is a maximum coolant flow for the pump or thermal system, and $\omega_{max}$ is a maximum speed of the pump.

19. The method of claim 11, wherein the pressure drop in the thermal system and the maximum flow for the thermal system are determined from a mathematical model of the thermal system, wherein the mathematical model of the thermal system is derived by considering an electric circuit model equivalent to the at least one coolant loop by respectively equating coolant flow and pressure drop or rise to current and voltage, and equating the pump to a battery, and equating the component to a variable electrical resistance.

20. The method of claim 19, further comprising:

applying, by the controller, Kirchhoff's first and second laws to the equivalent electric circuit model to determine coolant flows through the at least one coolant loop.

* * * * *